(12) United States Patent
Kawahara

(10) Patent No.: US 6,733,911 B2
(45) Date of Patent: May 11, 2004

(54) FUEL CELL

(75) Inventor: Tatsuya Kawahara, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 273 days.

(21) Appl. No.: 09/912,460

(22) Filed: Jul. 26, 2001

(65) Prior Publication Data

US 2002/0018923 A1 Feb. 14, 2002

(30) Foreign Application Priority Data

Jul. 26, 2000 (JP) .................................... 2000-225191

(51) Int. Cl.[7] .............................. H01M 8/04; H01M 8/10
(52) U.S. Cl. ............................. 429/26; 429/30; 429/34
(58) Field of Search .............................. 429/26, 30, 34, 429/17

(56) References Cited

U.S. PATENT DOCUMENTS 6,015,634 A * 1/2000 Bonville et al. ............ 429/17
6,566,002 B2 * 5/2003 Yoshimoto et al. .......... 429/32

FOREIGN PATENT DOCUMENTS

| JP | H5-144451 | 6/1993 | |
| JP | H7-320755 | 12/1995 | |
| JP | H8-138692 | 5/1996 | |
| JP | 11097041 A * | 4/1999 | ............ H01M/8/02 |

* cited by examiner

Primary Examiner—Gregg Cantelmo
(74) Attorney, Agent, or Firm—Kenyon & Kenyon

(57) ABSTRACT

A polymer electrolyte fuel cell includes a high-temperature portion and a low-temperature portion in a cell plane. The fuel cell includes an oxidant gas passage where an oxidant gas flows. An oxidant gas flow is directed from the high-temperature portion to the low-temperature portion of the cell so that water generated during operation recirculates in the oxidant gas passage to permit self-humidification of the fuel cell.

9 Claims, 3 Drawing Sheets

FUEL CELL

BACKGROUND OF THE INVENTION

1. Field of the Invention

The present invention relates to a fuel cell. More particularly, the present invention relates to a PEFC (Polymer Electrolyte Fuel Cell) which can humidify an electrolyte membrane of the cell by itself.

2. Description of Related Art

A PEFC apparatus includes individual fuel cells. Each fuel cell includes a membrane-electrode assembly (MEA) and a separator. The MEA includes an electrolyte membrane and a pair of electrodes disposed on opposite sides of the electrolyte membrane. The pair of electrodes include an anode provided on one side of the membrane and constructed of a first catalyst layer and a first diffusion layer, and a cathode provided on the other side of the membrane and constructed of a second catalyst layer and a second diffusion layer. The separator has a passage formed therein for supplying fuel gas (hydrogen) to the anode and for supplying oxidant gas (oxygen, usually, air) to the cathode. A plurality of fuel cells are piled to construct a module. A number of modules are piled, and electrical terminals, electrical insulators, and end plates are disposed at opposite ends of the pile of modules to construct a stack of fuel cells. After tightening the stack of fuel cells between the opposite end plates in a fuel cell stacking direction, the end plates are coupled to the fastening member (for example, a tension plate) extending in a fuel cell stacking direction outside the pile of fuel cells by bolts extending perpendicularly to the fuel cell stacking direction.

In the PEFC, at the anode, hydrogen is changed to positively charged hydrogen ions (i.e., protons) and electrons. The hydrogen ions move through the electrolyte to the cathode where the hydrogen ions react with oxygen supplied and electrons (which are generated at an anode of the adjacent MEA and move to the cathode of the instant MEA through a separator) to form water as follows:

At the anode: $H_2 \rightarrow 2H^+ + 2e^-$ 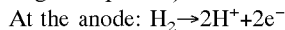

the cathode: $2H^+ + 2e^- + (½)O_2 \rightarrow H^2O$ 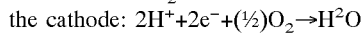

In order that the hydrogen ions move through the electrolyte, the electrolyte membrane has to be aqueous. If the aqueous concentration decreases, the electric resistance of the electrolyte membrane increases accompanied by a decrease in an output voltage and a decrease in an output power.

To cool the fuel cells, the temperature of which rises due to the heat generated at the water production reaction and a Joulean heat, a cooling water passage is formed at every cell or at every module and a cooling water is caused to flow in the cooling water passage. Along the flow direction of the cooling water, a low-temperature portion (at about 75° C.) at the upstream portion and a high-temperature portion (at about 85° C.) at the downstream portion are caused in the cell.

To maintain the aqueous condition of the electrolyte membrane, usually, the hydrogen and the air supplied to the cell are humidified by respective humidifiers before they are supplied to the cells. Japanese Patent Publication No. HEI 7-320755 discloses that the fuel gas is humidified and that the fuel gas is caused to flow in the cell from a high-temperature portion to a low-temperature portion so that a distribution of the relative humidity of the fuel gas along the fuel gas passage is uniform whereby the power output of the fuel cell is improved.

However, since no product water is produced at the anode unlike at the cathode and therefore not so much water exists in the fuel gas as in the oxidant gas, even if the humidity distribution control of the fuel gas is conducted like Japanese Patent Publication No. HEI 7-320755, there is little effect in obtaining a uniformly aqueous condition of the electrolyte membrane over the entire area of the cell, and so it is yet necessary to provide humidifiers for the fuel gas and the oxidant gas.

SUMMARY OF THE INVENTION

An object of the present invention is to provide a fuel cell capable of conducting a self-humidification of the cell utilizing the product water of the cell and operable stably with no separate humidifier.

A fuel cell according to the present invention is of a PEFC-type and includes a cell plane with a high-temperature portion and a low-temperature portion. The fuel cell includes an oxidant gas passage where an oxidant gas flows. The oxidant gas passage is formed in the cell and extends parallel to the cell plane. An oxidant gas flow direction is directed from the high-temperature portion to the low-temperature portion so that a product water recirculates in the oxidant gas passage.

The oxidant gas flow direction may be reverse to the direction of gravity.

The oxidant gas passage includes an upstream portion and a downstream portion. The upstream portion of the oxidant gas passage may be provided with a hydrophilicity, and the downstream portion of the oxidant gas passage may be provided with a hydrophobicity.

The fuel cell further includes a fuel gas passage where a fuel gas of pure hydrogen flows. The fuel gas passage is formed in the cell and extends parallel to the cell plane. A fuel gas flow direction may be directed from the high-temperature portion to the low-temperature portion.

With the above fuel cell according to the present invention, since the oxidant gas flow direction is directed from a high-temperature portion to a low-temperature portion of the cell, a water vapor of the product water is condensed to a water drop at a gas outlet located at the low-temperature portion. Then, the water drop recirculates to a gas inlet located at the high-temperature portion where the water drop is evaporated and raises the humidity of the oxidant gas. By this mechanism, the product water recirculates in the cell plane and conducts a self-humidification of the cell, whereby the fuel cell is stably operated even with no humidifier.

BRIEF DESCRIPTION OF THE DRAWINGS

The above and other objects, features, and advantages of the present invention will become more apparent and will be more readily appreciated from the following detailed description of the preferred embodiments of the present invention in conjunction with the accompanying drawings, in which.

DETAILED DESCRIPTION OF THE PREFERRED EMBODIMENTS

Figure 1:
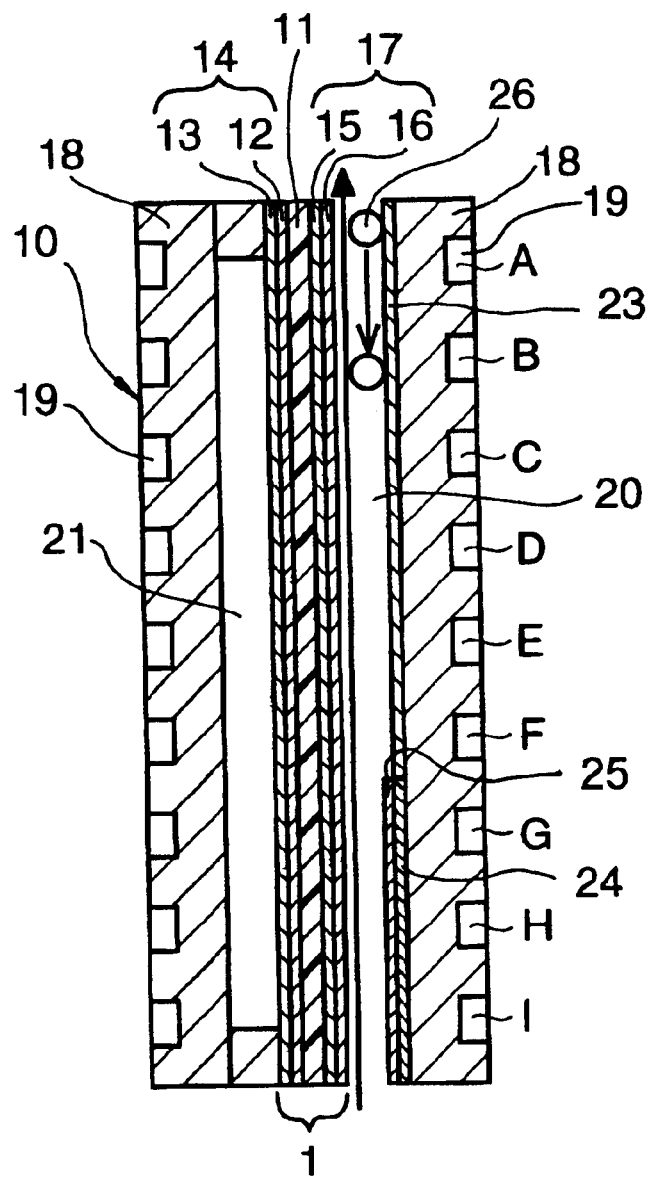
FIG. 1 is a cross-sectional view of a fuel cell according to a first embodiment of the present invention.
Figure 2:
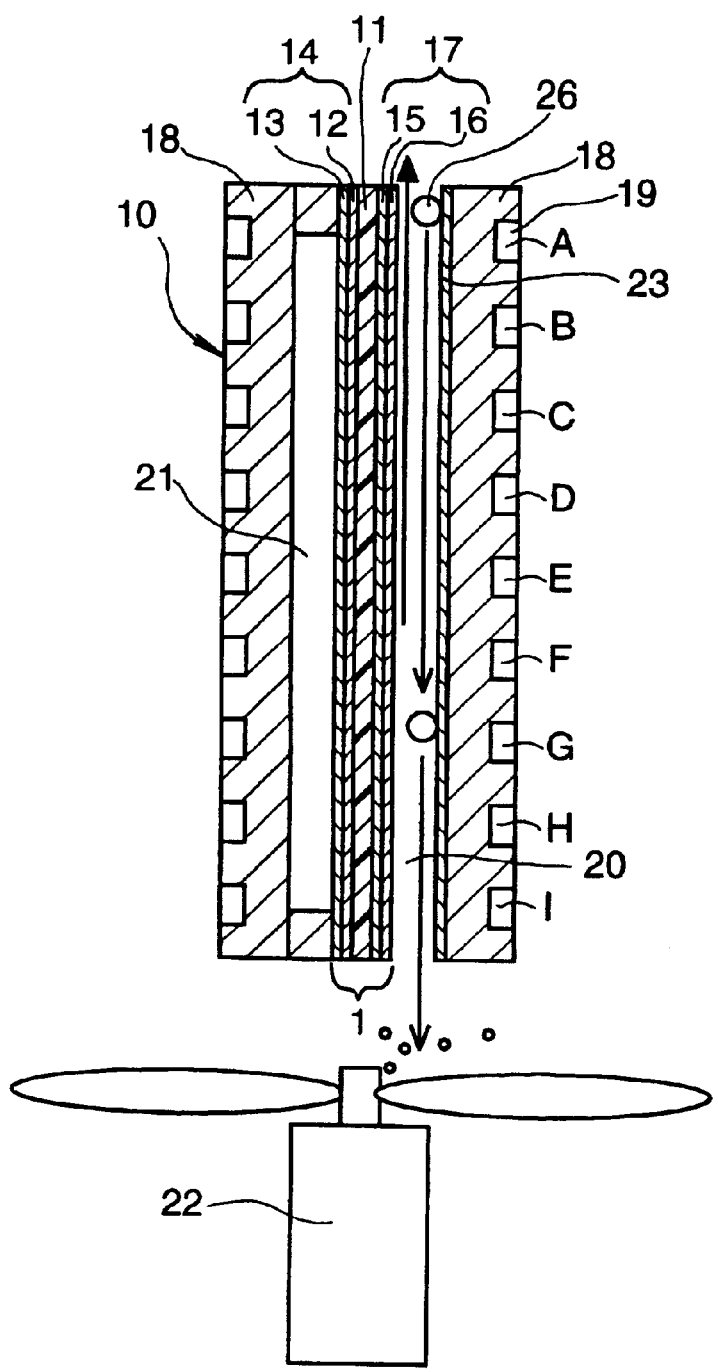
FIG. 2 is a cross-sectional view of a fuel cell and a compressor or a blower according to a second embodiment of the present invention.

A fuel cell according to the present invention will be explained with reference to FIGS. 1–3. FIG. 1 illustrates a fuel cell according to a first embodiment of the present invention, and FIG. 2 illustrates a fuel cell according to a second embodiment of the present invention. Portions having the same or similar structures over the first and the second embodiments of the present invention are denoted with the same reference numerals over the first and the second embodiments of the present invention.

First, the portions having the same or similar structures over the first and the second embodiments of the present invention will be explained with reference to FIG. 1.

A fuel cell 10 according to the present invention is of a polymer electrolyte fuel cell (hereinafter, PEFC)-type. The fuel cell 10 is mounted to, for example, a vehicle. However, the fuel cell 10 may be used for other than a vehicle.

As illustrated in FIG. 1, the PEFC 10 includes a stack of individual fuel cells 23. Each fuel cell includes a membrane-electrode assembly (MEA) 1, and a separator 18. The MEA 1 includes an electrolyte membrane 11 and a pair of electrodes disposed on opposite sides of the membrane 11. The pair of electrodes include an anode 14 provided on one side of the membrane 11 and a cathode 17 provided on the other side of the membrane 11. The anode 14 may include a first catalyst layer 12 and a first diffusion layer 13, and the cathode 17 may include a second catalyst layer 15 and a second diffusion layer 16. The separator 18 has a passage formed therein for supplying fuel gas (hydrogen) to the anode 14 and oxidant gas (oxygen, usually, air) to the cathode 17. A plurality of fuel cells are piled, and electrical terminals, electrical insulators, and end plates are disposed at opposite ends of the pile of fuel cells to construct a stack of fuel cells (not shown). FIG. 1 (or FIG. 2) illustrates a single cell. The fuel gas may be a pure hydrogen or a hydrogen produced by reforming other fuel than the pure hydrogen such as a natural gas, gasoline, etc. The pure hydrogen does not include water, but the hydrogen produced by reforming other fuel than the pure hydrogen by water vapor includes water.

In the separator 18, at least one of an oxidant gas passage 20 (an air passage), a fuel gas passage 21 (a hydrogen passage), and a coolant passage 19 (a cooling water passage) is formed. The cooling water passage 19 cools the fuel cell, the temperature of which rises due, to the heat generated at the water production reaction and a Joulean heat. A plurality of cells construct a module, and the cooling water passage 19 is formed at every cell or at every, module.

The separator 18 operates to separate the hydrogen and the air from each other, to separate the hydrogen and the cooling water from each other, and to separate the air and the cooling water from:each other. The separator 18 operates also as an electric current passage between the individual cells connected in series.

The separator 18 is constructed of a carbon plate or an assembly of metal plates on which a ceramic coating may be formed. If the ceramic coating is formed at the entire surface of the metal plates, the ceramic coating has to have an electrical conductivity. If the ceramic coating is formed at the surfaces of the fluid passages only and is not formed at the contact surface with the diffusion layer, the ceramic coating does not need to have an electrical conductivity. Each of the air passage 20, the hydrogen passage 21, and the cooling water passage 19 may be constructed of a groove formed in the separator or a space formed between adjacent separators distanced from each other by protrusions integrally formed to one of the adjacent separators.

FIG. 1 (or FIG. 2) illustrates a first separator 18 provided on one side of the MEA and a second separator 18 provided on the other side of the MEA. The first a separator 18 has the oxidant gas passage (the air passage) 20 formed in a first plane and the cooling water passage 19 formed in a second plane, and the second separator has the fuel gas passage (the hydrogen passage) 21 formed in a first plane and the cooling water passage 19 formed in a second plane. The cooling water passage formed in the first separator of one cell and the cooling water passage formed in the second separator of an adjacent cell cooperate with each other to form a cooling water passage having a full-size cross section.

The cooling water passage 19 may be constructed of a single continuous passage or a plurality of passages independent of each other.

In the case where the cooling water passage is constructed of a single continuous passage, the cooling water is at about 75° C. at the cooling water inlet to the cell, rises in temperature during flowing through the cooling water passage 19 in the cell, and is at about 85° C. at the cooling water outlet from the cell. More particularly, in FIG. 1 (or FIG. 2), in a case where the cooling water passage including cooling water passage portions A, B, C, D, E, F, G, H and I (the number may be any) is continuous, the temperature of the cooling water rises in the order of portions A, B, C, D, E, F, G, H and I (temperatures at portions $A \leq B \leq C \leq D \leq E \leq F \leq G \leq H \leq I$), where the portion A is connected to the cooling water inlet and the portion I is connected to the cooling water outlet.

In the case where the cooling water passage is constructed of a plurality of passages independent of each other, each cooling water passage portion can be controlled to a desired temperature independently of other portions. For example, the temperature of the cooling water passage portion A can be controlled to a much lower temperature than that of the cooling water passage portion B (temperature at portion A<B).

In this way, a temperature inclination (temperature change) is formed in the cell plane. The temperature change or temperature distribution in the oxidant gas passage 20 and the fuel gas passage 21 is substantially the same as the temperature change in the cell plane.

In the fuel cell apparatus according to the present invention, neither a humidifier for humidifying the oxidant gas nor a humidifier for humidifying the fuel gas is provided in the respective gas supply lines. In the case where the hydrogen is produced by reforming other fuel than the pure hydrogen such as a natural gas, gasoline, etc. by a water vapor, the fuel gas is naturally humidified at the reforming stage. Such a naturally humidified fuel gas is included within the scope of the fuel gas of the present invention which is not humidified by a separate humidifier.

In the fuel cell 10 which includes the cell plane with the high-temperature portion and the low-temperature portion and induces the oxidant gas passage 20 formed in the cell and extending parallel to the cell plane, an oxidant gas flow direction is directed from the high-temperature portion to the low-temperature portion. The gas inlet of the oxidant gas passage 20 is located at the high-temperature portion of the cell and is located near the cooling water passage portion I. The gas outlet of the oxidant gas passage 20 is located at the low-temperature portion of the cell and is located near the cooling water passage portion A. The oxidant gas flows into the oxidant gas passage 20 in the cell through the gas inlet near the cooling water passage portion I and flows out from the oxidant gas passage 20 in the cell through the gas outlet near the cooling water passage portion A.

In the above structure, the reaction product water in the oxidant gas passage 20 is condensed and changed to a water drop 26 at the low temperature portion near the gas outlet, moves to the high-temperature portion near the gas inlet (in the first embodiment) or to a location further upstream of the gas inlet (in the second embodiment) to the cell due to gravity or other means (for example, a capillarity or a gas flow), and is evaporated near the gas inlet to raise the humidity of the oxidant gas and flows together with the oxidant gas in the oxidant gas flow direction. In this way, the product water recirculates by itself, that is, conducts a self-recirculation in the oxidant gas passage 20.

Preferably, the cell plane is directed vertically, and the low-temperature portion of the cell is located higher than the high-temperature portion of the cell. The oxidant gas flow direction is reverse to a direction of gravity, including a vertically upward direction and an obliquely upward direction. In this structure, the water drop produced at the lower temperature portion near the gas outlet flows down due to gravity in the oxidant gas passage 20 to the high-temperature portion near the gas inlet. Therefore, a special water drop driving device does not need to be provided for driving the water drop toward the gas inlet, thus avoiding the cost and space penalties of a water drop driving device.

The oxidant gas passage 20 includes an upstream portion and a downstream portion. Preferably, the upstream portion of the oxidant gas passage 20 is provided with a hydrophilic-treated portion, and the downstream portion of the oxidant gas passage 20 is provided with a hydrophobic-treated portion. Reference numeral 23 illustrates the hydrophobicity-treated portion, and reference numeral 24 illustrates the hydrophilicity-treated portion.

The hydrophobicity treatment is a treatment to cause the surface of the oxidant gas passage to have a water repellent characteristic. The hydrophobicity treatment includes, for example, a fluororesin coating formed at a surface of the downstream portion of the oxidant gas passage 20. To cause the water vapor to be easily condensed at the downstream portion of the oxidant gas passage, it is preferable to roughen the surface of the downstream portion of the oxidant gas passage. The surface of an intermediate portion of the oxidant gas passage is preferable to be kept smooth in order to cause the water drop to flow down along the surface to the upstream portion of the oxidant gas passage The hydrophilicity treatment is a treatment to cause a water drop to spread in the form of a 25 at the surface of the oxidant gas passage. The hydrophilicity treatment includes, for example, a silicon dioxide ($SiO_2$) layer formed at the surface of the upstream portion of the oxidant gas passage 20. Since silicon dioxide is an electrical insulation material, the silicon dioxide layer should not be formed at the contact surface of the separator 18 with the electrode to keep an electrical conductivity between the separator and the electrode, by masking the contact surface of the separator 18 with the electrode when coating the silicon dioxide or removing a coated silicon dioxide layer from the contact surface of the separator 18 with the electrode before the coating is dried to a solid.

With the fuel gas passage 21, since no water produced, control of the water in the fuel gas passage 21 cannot contribute to the wetting of the electrolyte membrane 11 so much as the self-circulation of the product water in the oxidant gas passage 20. However, by preventing the water or water vapor penetrating through the electrolyte membrane into the fuel gas passage from being exhausted too much from the fuel gas passage 21, the water or water vapor in the fuel gas passage 21 can contribute to maintaining the humidity of the electrolyte membrane 11.

To maintain the humidity of the electrolyte membrane 11, in a case where the fuel gas is pure hydrogen and the cell plane extends vertically in parallel with the fuel gas passage 21, it is preferable that a fuel gas flow direction is directed from the high-temperature portion of the call to the low-temperature portion of the cell. In the structure, the water vapor is condensed to a water drop near the fuel gas outlet located at the low-temperature portion and flows due to, for example, gravity to the fuel gas inlet located at the high-temperature portion where the water drop is evaporated again. As a result, the water in the fuel gas conducts a self-recirculation in the fuel gas passage 21.

In a case where the fuel gas is hydrogen produced by reforming other fuel than the pure hydrogen and thus contains water, and in a case where the amount of the contained water is large so that the fuel gas passage may be blocked by the water, the fuel gas flow direction may be directed from the low-temperature portion of the cell to the high-temperature portion and the fuel gas outlet may be positioned lower than the fuel gas inlet. By this structure, the water drop produced through condensing of the water vapor near the fuel gas inlet flows due to gravity to the fuel gas outlet through which the water in the form of a water drop or a water vapor goes out.

Due to the above structures, the following operation is conducted.

More particularly, since the oxidant gas flow direction is directed from the high-temperature portion to the low-temperature portion in the cell, the water vapor of the product water is condensed to a water drop at the low-temperature portion located near the oxidant gas outlet. Then, the water drop recirculates to the high temperature-portion located near the gas inlet, where the water drop is evaporated and raises the humidity of the oxidant gas. By this mechanism, the product water recirculates in the cell and conducts a self-humidification of the cell, whereby the fuel cell is stably operated even with no humidifier.

Figure 3:
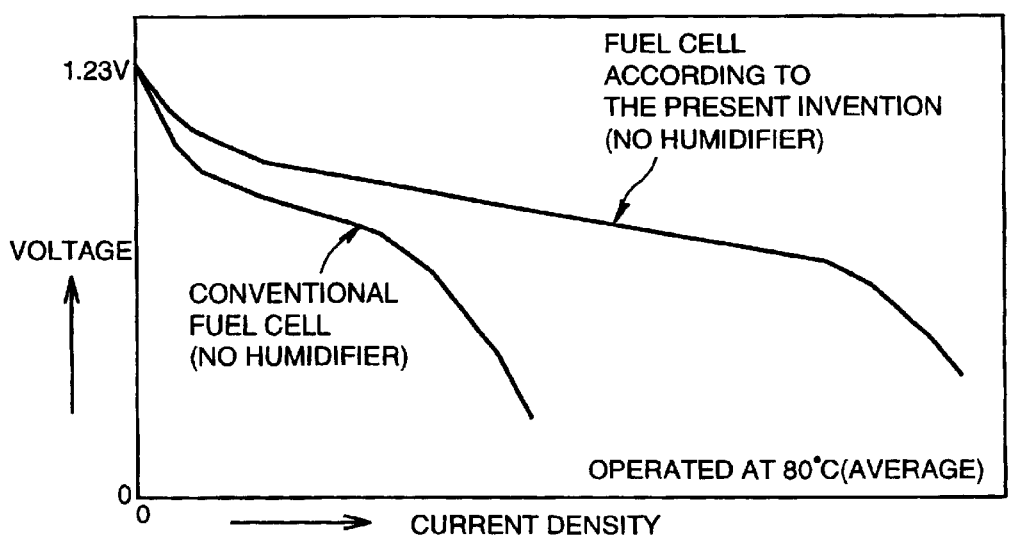
FIG. 3 is a graph of an electric voltage versus an current density, of the fuel cell according to the first and the second embodiments of the present invention and of a conventional fuel cell.

FIG. 3 illustrates a voltage versus current density characteristic of the fuel cell of a self-humidifying-type according to the present invention provided with no humidifier and of a conventional fuel cell provided with no humidifier in the oxidant gas and fuel gas supply lines. The average operational temperature in the cell plane was 80° C. As can be seen from FIG. 3, the current density and the voltage of the fuel cell according to the present invention are higher than those of the conventional fuel cell. Due to the high voltage, the power generating efficiency of the fuel cell according to the present invention is higher than that of the conventional fuel cell. Further, due to the high current density, the output power of the fuel cell according to the present invention is higher than that of the conventional cell.

Further, since the oxidant gas flow direction (which may be included from the vertical direction) is reverse to the direction of gravity, the water drop produced at the low-temperature portion can flow down to the high-temperature portion due to gravity. Accordingly, in the self-recirculation of the product water in the cell, a special device for driving the water drop does not need to be provided. A flow velocity of the oxidant gas is not so high as obstructs the flowing down of the water drop due to gravity.

Further, since the upstream portion of the oxidant gas passage is provided with a hydrophilicity-treated portion and the downstream portion of the oxidant gas passage is provided with a hydrophobicity-treated portion, a water drop is likely to be produced at the downstream portion of the oxidant gas passage, and spreading and evaporation of the water drop is likely to occur at the upstream portion of the oxidant gas passage.

Further, since the fuel gas flow direction is directed from the high-temperature portion to the low-temperature portion of the cell, a water vapor from the electrolyte membrane and contained in the fuel gas can be trapped at the fuel gas outlet and is prevented from escaping outside the cell. As a result, the water vapor contained in the fuel gas also contributes to a non-humidifier operation of the fuel cell.

Next, portions unique to each embodiment of the present invention will be explained.

In a fuel cell according to the first embodiment of the present invention, as illustrated in FIG. 1, the cooling water flows in the order of passage portions A, B, C, D, E, F, G, H, and I. The passage portion A is located in the low-temperature portion of the cell and the passage portion I is located in the high-temperature portion of the cell. The low-temperature portion is located higher than the high-temperature portion. The oxidant gas (air) flows in the oxidant gas passage 20 from the high-temperature portion to the low-temperature portion. A hydrophobicity-treatment is conducted to the oxidant gas passage 20 at the low-temperature portion of the cell, and a hydrophilicity-treatment is conducted to the oxidant gas passage 20 at the high-temperature portion of the cell.

By this structure, the product water in the oxidant gas passage 20 is condensed to a water drop at the low-temperature portion, and flows down due to gravity to the high-temperature portion, where the water drop is evaporated. In this way, the product water conducts a self-recirculation in the cell plane and humidifies the electrolyte membrane 11. As a result, a stable, non-humidifier operation of the fuel cell becomes possible.

In a fuel cell according to the second embodiment of the present invention, as illustrated in FIG. 2, the cooling water flows in the order of passage portions A, B, C, D, E, F, G, H, and I. The passage portion A is located in the low-temperature portion of the cell and the passage portion I is located in the high-temperature portion of the cell. The low-temperature portion is located higher than the high-temperature portion. The oxidant gas (air) flows in the oxidant gas passage 20 from the high-temperature portion to the low-temperature portion. A hydrophobicity-treatment is conducted to the oxidant gas passage 20 at the low-temperature portion of the cell, but a hydrophilicity-treatment is not conducted to the oxidant gas passage 20 at the high-temperature portion of the cell. A water drop atomizing device such as a blower or a compressor 22 is provided at a further upstream of the oxidant gas inlet to the cell. The blower or the compressor may be replaced by a vibrational device.

By this structure, the product water in the oxidant gas passage 20 is condensed to a water drop at the low-temperature portion, and flows down due to gravity to the blower or, the compressor 22, where the water drop is atomized and is evaporated by the gas raised in temperature due to the adiabatic compression by the blower or the compressor 22. In this way, the product water conducts a self-recirculation in the oxidant gas passage in the cell and between the cell and the blower or the compressor 22, and humidifies the electrolyte membrane 11. As a result, a stable, non-humidifier operation of the fuel cell becomes possible.

Further, when the water is evaporated at the blower or the compressor 22, the latent heat at the evaporation decreases the gas temperature. As a result, a drying-up near the oxidant gas inlet is suppressed According to the present invention, the following technical advantages are obtained:

With the above fuel cell according to the present invention, since the oxidant gas flow direction is directed from a high-temperature portion to a low-temperature portion of the cell a water vapor of the product water is condensed to a water drop at the low-temperature portion. Then, the water drop recirculates to the high-temperature portion where the water drop is evaporated and raises the humidity of the oxidant gas. By this mechanism, the product water recirculates in the cell and conducts a self-humidification of the cell, whereby the fuel cell is stably operated even with no humidifier.

In the case where the low-temperature portion of the cell is located higher than the high-temperature portion of the cell, the water drop can circulate from the low-temperature portion to the high-temperature portion due to gravity, without any means for driving the water drop.

In the case where the oxidant gas flow direction (which may incline from the vertical direction) is reverse to the direction of gravity, the water drop produced at the low-temperature portion can circulate to the high-temperature portion due to gravity. Accordingly, a special device for driving the water drop does not need to be provided. A flow velocity of the oxidant gas is not so high as obstructs the flowing down of the water drop due to gravity.

In the case where the upstream portion of the oxidant gas passage is provided with a hydrophilicity-treated portion and the downstream portion of the oxidant gas passage is provided with a hydrophobicity-treated portion, a water drop is likely to be produced at the downstream portion of the oxidant gas passage, and spreading and evaporation of the water drop is likely to occur at the upstream portion of the oxidant gas passage.

In the case where the downstream portion of the oxidant gas passage is provided with a hydrophobicity-treated portion and a water drop atomizing device is disposed at a location upstream of an inlet of the oxidant gas passage to the cell, a water drop is likely to be produced at the downstream portion of the oxidant gas passage, and atomizing and evaporation of the water drop is likely to occur at the water drop atomizing device.

In the case where a fluororesin coating, is formed at a surface of the downstream portion of the oxidant gas passage, a water drop is likely to be produced at the downstream portion of the oxidant gas passage.

In the case where a silicon dioxide layer is formed at a surface of the upstream portion of the oxidant gas passage, spreading and evaporation of a water drop at the upstream portion of the oxidant gas passage easily occurs.

In the case where a fuel gas of pure hydrogen flows in the fuel gas passage and a fuel gas flow direction is directed from the high-temperature portion to the low-temperature portion, the water contained in the fuel gas can be trapped at the fuel gas outlet and an excessive exhaust of the water from the cell can be suppressed.

In the case where a fuel gas including water flows in the fuel gas passage, by directing a fuel gas flow direction from the low-temperature portion to the high-temperature portion, the excess water contained in the fuel gas can go out from the cell so that blockage of the fuel gas passage by the excess water can be prevented.

Since a self-humidification of the cell is conducted due to the recirculation of a product water in the oxidant gas passage, the fuel cell is stably operated even with no humidifier.

Although the present invention has been described with reference to specific exemplary embodiments, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. A polymer electrolyte fuel cell including a high-temperature portion and a low-temperature portion in a cell plane, said fuel cell comprising:

an oxidant gas passage formed in said fuel cell, said oxidant gas passage including an upstream portion and a downstream portion, said upstream portion of said oxidant gas passage being provided with a hydrophilicity-treated portion, and said downstream portion of said oxidant gas passage being provided with a hydrophobicity-treated portion;

wherein an oxidant gas flow is directed within said oxidant gas passage from said high-temperature portion to said low-temperature portion of the fuel cell so that water produced during operational of the fuel cell recirculates in said oxidant gas passage.

2. A fuel cell according to claim 1, wherein said low-temperature portion is located at a higher position than said high-temperature portion.

3. A fuel cell according to claim 1, wherein said oxidant gas flow direction is reverse to a direction of gravity.

4. A fuel cell according to claim 1, wherein said hydrophobicity-treated portion provided to said downstream portion of said oxidant gas passage includes a fluororesin coating formed at a surface of said downstream portion of said oxidant gas passage.

5. A fuel cell according to claim 1, wherein said hydrophilicity-treated portion provided to said upstream portion of said oxidant gas passage includes a silicon dioxide layer formed at a surface of said upstream portion of said oxidant gas passage.

6. A fuel cell according to claim 1, further comprising:

a fuel gas passage formed in said fuel cell, wherein a fuel gas flow is directed from said high-temperature portion to said low-temperature portion.

7. A fuel cell according to claim 1, further comprising:

a fuel gas passage formed in said fuel cell, said fuel gas passage including a fuel gas inlet to the cell and a fuel gas outlet from the cell, wherein a fuel gas flow is directed from said low-temperature portion to said high-temperature portion, and said fuel gas outlet is positioned lower than said fuel gas inlet.

8. A polymer electrolyte fuel cell including a high-temperature portion and a low-temperature portion in a cell plane, said fuel cell comprising:

an oxidant gas passage formed in said fuel cell, wherein said oxidant gas passage includes an upstream portion and a downstream portion, said downstream portion of said oxidant gas passage being provided with a hydrophobicity-treated portion, and further comprising a water drop atomizing device disposed at a location upstream of an inlet of said oxidant gas passage;

wherein an oxidant gas flow is directed within said oxidant gas passage from said high-temperature portion to said low-temperature portion of the fuel cell so that water produced during operation of the fuel cell recirculates in said oxidant gas passage.

9. A fuel cell according to claim 8, wherein said hydrophobicity-treated portion provide to said downstream portion of said oxidant gas passage includes a fluororesin coating formed at a surface of said downstream portion of said oxidant gas passage.

* * * * *